US006232426B1

(12) United States Patent
Orikabe et al.

(10) Patent No.: US 6,232,426 B1
(45) Date of Patent: May 15, 2001

(54) EPOXY RESIN COMPOSITION

(75) Inventors: Hiroshi Orikabe; Kiyomiki Hirai, both of Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/255,850

(22) Filed: Feb. 23, 1999

(30) Foreign Application Priority Data

Mar. 12, 1998 (JP) ................................. 10-061016

(51) Int. Cl.⁷ ..................................... C08G 59/66
(52) U.S. Cl. ................. 528/91; 528/90; 528/94
(58) Field of Search ................... 528/90, 91, 94

(56) References Cited

U.S. PATENT DOCUMENTS

| 3,352,810 | 11/1967 | Cameron et al. . |
| 3,732,309 | 5/1973 | Garnish et al. . |
| 3,746,685 | 7/1973 | Dobinson et al. . |
| 3,853,959 | 12/1974 | Dobinson et al. . |
| 3,914,288 | 10/1975 | Garnish et al. . |
| 5,430,112 | 7/1995 | Sakata et al. . |
| 5,464,910 | 11/1995 | Nakatsuka et al. . |

FOREIGN PATENT DOCUMENTS

| 0 594 133 | 4/1994 | (EP) . |
| 0 659 793 | 6/1995 | (EP) . |
| 42-26535 | 1/1968 | (JP) . |
| 46-00732 | 10/1971 | (JP) . |
| 47-32319 | 8/1972 | (JP) . |
| 60-21648 | 5/1985 | (JP) . |
| 61-159417 | 7/1986 | (JP) . |
| 6-073156 | 3/1994 | (JP) . |
| 6-172495 | 6/1994 | (JP) . |
| 6-211969 | 8/1994 | (JP) . |
| 6-211970 | 8/1994 | (JP) . |

OTHER PUBLICATIONS

Patent Abstracts of Japan, vol. 014, No. 306 (C–0725), Jul. 3, 1990, JP 2–103224, Apr. 16, 1990.
Patent Abstracts of Japan, vol. 095, No. 011, Dec. 26, 1995, JP 07–224148, Aug. 22, 1995.
Chemical Abstracts, vol. 113, No. 016, Oct. 15, 1990, "Curable Resin Compositions With Improved Pot Life", JP 02–102267, Apr. 13, 1998.

*Primary Examiner*—Robert Dawson
*Assistant Examiner*—D. Aylward
(74) *Attorney, Agent, or Firm*—Oblon, Spivak, McClelland, Maier & Neustadt, P.C.

(57) ABSTRACT

Disclosed herein is a one-part polythiol-type epoxy resin composition having an excellent low-temperature quick curability and a good storage stability (shelf stability), which can be prepared by using, as essential components, (1) an epoxy resin having two or more epoxy groups per one molecule, (2) a thiol compound having two or more thiol groups per one molecule, (3) a solid dispersion-type latent curing accelerator and (4) a borate ester compound.

20 Claims, No Drawings

EPOXY RESIN COMPOSITION

BACKGROUND OF THE INVENTION

1. Field of the Invention

The present invention relates to a one-part polythiol-type epoxy resin composition having an excellent low-temperature quick curability (i.e., being excellent in quick and low-temperature curability) and a good storage stability or shelf stability (i.e., being good in storage stability).

2. Discussion of the Background

An epoxy resin composition prepared by using a polythiol as a curing agent and a tertiary amine as a curing accelerator has been used as a low-temperature quick-curable epoxy resin composition which can be cured even at such a low temperature of from 0° C. to −20° C., and has been used as an adhesive, a sealer or a casting mold.

However, such an epoxy resin composition has usually quite a short pot life of from several seconds to several minutes after the mixing of the starting ingredients, involving such defect that the mixing of the starting ingredients, and the defoaming and coating of the resulting mixture cannot be conducted for a satisfactorily long period of time. Further, it is poor in workability since a worker has to prepare an epoxy resin composition whenever it is used. Furthermore, the leftover from such a composition cannot be stored, and therefore, has to be discarded, which, in turn, is undesirous from the view point of an energy saving and an environmental problem.

For example, the use of a thiol compound obtained by an esterification reaction of a polyol with a mercapto organic acid as a curing agent for an epoxy resin composition is described in JP-B-41-7236, JP-B-42-26535, JP-B-47-32319, JP-A-46-732 and JP-B-60-21648. However, curing accelerators used in such epoxy resin compositions are liquid amines. Such compositions obtained by using liquid amines as a curing accelerator are very short in their pot life, from several minutes to several tens of minutes, and such very short pot life is quite problematic in the working operation. Under these circumstances, the development of a polythiol-type epoxy resin composition which has a satisfactorily long pot life or which is rendered one-part type to improve a workability has been in high demand.

In order to solve this problem, a method in which an acid anhydride or a mercapto organic acid is added as a curing retarder to prolong a pot life was studied (JP-A-61-159417), but it was not said to be well satisfactory.

JP-A-06-211969 and JP-A-06-211970 describe an example of a polythiol-type epoxy resin composition obtained by using a solid dispersion-type amine adduct latent curing accelerator or a reaction product of a compound having an isocyanate group with a compound having at least one primary or secondary amino group in one molecule as a curing accelerator to improve a pot life. However, the composition is not yet satisfactory in shelf stability, and a low-temperature quick curability as a merit of a thiol-type epoxy resin composition is not brought out sufficiently.

SUMMARY OF THE INVENTION

It is one object of the present invention to provide a polythiol-type one-part epoxy resin composition which exhibits a low-temperature quick curability being by far better than that of the conventional epoxy resin composition and which has a good shelf stability.

The present inventors have assiduously conducted investigations to solve the problems, and have consequently found that a one-part polythiol-type epoxy resin composition having a good shelf stability can be obtained by adding a composition composed of three components, (1) an epoxy resin, (2) a polythiol compound having two or more thiol groups in one molecule as a curing agent and (3) a solid dispersion-type latent curing accelerator as a curing accelerator, further with (4) a borate ester compound. They have further found that, when the mixing ratio of such epoxy resin to such thiol compound is set at from 0.5 to 1.2 in terms of the ratio of the SH gram equivalent number of the thiol compound to the epoxy gram equivalent number of the epoxy resin, and the amounts of such solid dispersion-type latent curing accelerator and such borate ester compound are set at from 1 to 60 parts by weight and from 0.1 to 30 parts by weight, per 100 parts by weight of the epoxy resin, respectively, then such a low-temperature quick curability which has not been so far provided is exhibited while maintaining a good shelf stability. These findings have led to the completion of the present invention.

Accordingly, the present invention relates to an epoxy resin composition comprising, as essential ingredients, (1) an epoxy resin having two or more epoxy groups in one molecule, (2) a thiol compound having two or more thiol groups in one molecule, (3) a solid dispersion-type latent curing accelerator and (4) a borate ester compound. And, it also relates to such epoxy resin composition, wherein the epoxy resin and the thiol compound are comprised in a ratio of from 0.5 to 1.2 in terms of the ratio of the SH gram equivalent number of the thiol compound to the epoxy gram equivalent number of the epoxy resin, and the solid dispersion-type latent curing accelerator is comprised in an amount of between 1 to 60 parts by weight and the borate ester compound is comprised in an amount of between 0.1 and 30 parts by weight, respectively, per 100 parts by weight of the epoxy resin.

DETAILED DESCRIPTION OF THE INVENTION

The present invention will be described in detail below.

In accordance with the present invention, any epoxy resin can be used insofar as it has two or more epoxy groups per one molecule on the average. Examples thereof include a polyglycidyl ether obtainable by reacting a polyhydric phenol such as bisphenol A, bisphenol F, bisphenol AD, catechol or resorcinol or a polyhydric alcohol such as glycerol or polyethylene glycol with epichlorohydrin; a glycidyl ether ester obtainable by reacting a hydroxycarboxylic acid such as p-hydroxybenzoic acid or β-hydroxynaphthoic acid with epichlorohydrin; a polyglycidyl ester obtainable by reacting a polycarboxylic acid such as phthalic acid or terephthalic acid with epichlorohydrin; an epoxydized phenolic novolak resin; an epoxydized cresol novolak resin; an epoxydized polyolefin; an alicyclic epoxy resin; and a urethane-modified epoxy resin. However, these are not critical.

The polythiol compound (a thiol compound having two or more thiol groups in one molecule) usable in accordance with the present invention is preferably a thiol compound in which basic impurities are contained in amounts as small as possible from the standpoint of the good shelf stability. Examples thereof include thiol compounds having two or more thiol groups per one molecule, which compounds can be produced through an esterification reaction of a polyol and a mercapto organic acid without the need of a basic substance as the reaction catalyst, such as trimethylolpropane tris(thioglycolate), pentaerythritol tetrakis (thioglycolate), ethylene glycol dithioglycolate, trimethylolpropane tris(β-thiopropionate), pentaerythritol tetrakis(β-thiopropionate) and dipentaerythritol poly(β-thiopropionate).

Likewise, a thiol compound having two or more thiol groups in one molecule which has been produced in the presence of a basic substance as the reaction catalyst and in which the alkali metal ion concentration has been reduced to 50 ppm or less through dealkalization, can also be used. Examples thereof include an alkyl polythiol compound such as 1,4-butanedithiol, 1,6-hexanedithiol or 1,10-decanedithiol; a terminal thiol group-containing polyether; a terminal thiol group-containing polythiol ether; a thiol compound obtainable by the reaction of an epoxy compound with hydrogen sulfide; and a terminal thiol group-containing thiol compound obtainable by the reaction of a polythiol compound with an epoxy compound.

Examples of the method of dealkalization of a polythiol compound product produced in the presence of a basic substance as the reaction catalyst include a method in which a polythiol compound product to be dealkalized is dissolved in an organic solvent such as acetone or methanol, and the resultant solution is neutralized with dilute hydrochloric acid or dilute sulfuric acid, followed by desalting through extraction, washing and the like, a method in which the polythiol compound moiety of such polythiol compound product is adsorbed on an ion exchange resin, and a method in which purification is conducted through distillation. However, these are not critical.

The solid dispersion-type latent curing accelerator usable in accordance with the present invention is a compound which is a solid insoluble in an epoxy resin at room temperature and which is solubilized through heating to act as an curing accelerator. Examples thereof include imidazole compounds which are solid at normal temperature, solid dispersion-type amine adduct-type latent curing accelerators such as a reaction product of an amine compound with an epoxy compound (amine-epoxy adduct type), and a reaction product of an amine compound with an isocyanate compound or a urea compound (urea adducttype).

Examples of the imidazole compound which is solid at normal temperature and can be used in accordance with the present invention include 2-heptadecylimidazole, 2-phenyl-4,5-dihydroxymethylimidazole, 2-undecylimidazole, 2-phenyl-4-methyl-5-hydroxymethylimidazole, 2-phenyl-4-benzyl-5-hydroxymethylimidazole, 2,4-diamino-6-(2-methylimidazolyl-(1))-ethyl-S-triazine, 2,4-diamino-6-(2'-methylimidazolyl-(1)'-ethyl-S-triazine.isocyanuric acid adduct, 2-methylimidazole, 2-phenylimidazole, 2-phenyl-4-methylimidazole, 1-cyanoethyl-2-phenylimidazole, 1-cyanoethyl-2-methylimidazole-trimellitate, 1-cyanoethyl-2-phenylimidazole-trimellitate, N-(2-methylimidazolyl-1-ethyl)-urea and N,N'-(2-methylimidazolyl-(1)-ethyl)-azipoyldiamide. However, these are not critical.

Examples of the epoxy compound which can be used as one of the starting materials to produce the solid dispersion-type amine adduct-type latent curing accelerator (amine-epoxy adduct type) usable in accordance with the present invention, include a polyglycidyl ether obtained by the reaction of a polyhydric phenol such as bisphenol A, bisphenol F, catechol or resorcinol or a polyhydric alcohol such as glycerol or polyethylene glycol with epichlorohydrin; a glycidyl ether ester obtainable by the reaction of a hydroxycarboxylic acid such as p-hydroxybenzoic acid or β-hydroxynaphthoic acid with epichlorohydrin; a polyglycidyl ester obtainable by the reaction of a polycarboxylic acid such as phthalic acid or terephthalic acid with epichlorohydrin; a glycidyl amine compound obtainable by the reaction of 4,4'-diaminodiphenylmethane or m-aminophenol with epichlorohydrin; a polyfunctional epoxy compound such as an epoxidized phenolic novolak resin, an epoxidized cresol novolak resin or an epoxidized polyolefin; and a monofunctional epoxy compound such as butyl glycidyl ether, phenyl glycidyl ether or glycidyl methacrylate. These are, however, not critical.

Any amine compound can be used as another starting material of the solid dispersion-type amine adduct-type latent curing accelerator in accordance with the present invention insofar as it has in one molecule one or more active hydrogens capable of an addition reaction with an epoxy group and one or more functional groups selected from the group consisting of a primary amino group, a secondary amino group and a tertiary amino group. Examples of such amine compound include aliphatic amines such as diethylene triamine, triethylene tetramine, n-propylamine, 2-hydroxyethylaminopropylamine, cyclohexylamine and 4,4'-diaminodicyclohexylmethane; aromatic amine compounds such as 4,4'-diaminodiphenylmethane and 2-methylaniline; and nitrogen atom-containing heterocyclic compounds such as 2-ethyl-4-methylimidazole, 2-ethyl-4-methylimidazoline, 2,4-dimethylimidazoline, piperidine and piperazine. However, these are not critical.

Of these, especially, a compound having a tertiary amino group in the molecule can be a starting material with which to give a latent curing accelerator having an excellent curing acceleration ability. Examples of such compound include primary or secondary amines having a tertiary amino group in the molecule, for example, amine compounds such as dimethylaminopropylamine, diethylaminopropylamine, di-n-propylaminopropylamine, dibutylaminopropylamine, dimethylaminoethylamine, diethylaminoethylamine and N-methylpiperazine, and imidazole compounds such as 2-methylimidazole, 2-ethylimidazole, 2-ethyl-4-methylimidazole and 2-phenylimidazole; and alcohols, phenols, thiols, carboxylic acids and hydrazides having a tertiary amino group in the molecule, such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris (dimethylaminomethyl)phenol, N-β-hydroxyethylmorpholine, 2-dimethylaminoethanethiol, 2-mercaptopyridine, 2-benzoimidazole, 2-mercaptobenzoimidazole, 2-mercaptobenzothiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide and isonicotinic acid hydrazide.

In order to further improve the epoxy resin composition of the present invention in shelf stability, an active hydrogen compound having two or more active hydrogens in the molecule can be used by adding as a third starting material in producing the latent curing accelerator usable in accordance with the present invention by the addition reaction of an epoxy compound with an amine compound. Examples of such active hydrogen compound include polyhydric phenols such as bisphenol A, bisphenol F, bisphenol S, hydroquinone, catechol, resorcinol, pyrogallol and a phenolic novolak resin; polyhydric alcohols such as trimethylolpropane; polybasic carboxylic acids such as adipic acid and phthalic acid; 1,2-dimercaptoethane; 2-mercaptoethanol; 1-mercapto-3-phenoxy-2-propanol; mercaptoacetic acid; anthranylic acid; and lactic acid.

Examples of the isocyanate compound which can be used as still another starting material of the solid dispersion-type amine adduct-type latent curing accelerator usable in accordance with the present invention include monofunctional isocyanate compounds such as n-butyl isocyanate, isopropyl isocyanate, phenyl isocyanate and benzyl isocyanate; polyfunctional isocyanate compounds such as hexamethylene diisocyanate, toluylene diisocyanate, 1,5-naphthalene diisocyanate, diphenylmethane-4,4'-diisocyanate, isophorone diisocyanate, xylylene diisocyanate, p-phenylene diisocyanate, 1,3,6-hexamethylene triisocyanate and bicycloheptane triisocyanate; and terminal isocyanate group-containing compounds obtainable by the reaction of one of these polyfunctional isocyanates with an active hydrogen compound. Examples of the terminal isocyanate group-containing compounds include a terminal isocyanate group-containing addition compound obtainable by the reaction of toluylene diisocyanate with trimethylolpropane, and a terminal isocyanate group-containing addition compound obtainable by the reaction of toluylene diisocyanate with pentaerythritol. However, these are not critical.

Further, examples of the urea compound include urea and thiourea. However, these are not critical.

The solid dispersion-type latent curing accelerator usable in accordance with the present invention can easily be obtained by taking the relevant starting materials in a combination of (A) two starting materials, namely, an amine compound and an epoxy compound, (B) three starting materials, namely, the two starting materials and an active hydrogen compound, or (C) two or three starting materials, namely, an amine compound and an isocyanate compound or/and a urea compound, mixing them, allowing the mixture react at a temperature of from room temperature to 200° C., then cooling and solidifying the reaction mixture, and pulverizing the same, or by reacting the starting materials in a solvent such as methyl ethyl ketone, dioxane or tetrahydrofuran, removing the solvent and then pulverizing the solid.

Typical examples of the solid dispersion-type latent curing accelerator which are on the market include an amine-epoxy adduct type (amine adduct type) such as "Amicure PN-23" (trade name of a product ex Ajinomoto Co., Inc.), "Amicure PN-H" (trade name of a product ex Ajinomoto Co., Inc.), "Hardener-X-3661S" (trade name of a product ex A. C. R. K.K.), "Hardener-X-3670S" (trade name of a product ex A. C. R. K.K.) , "Novacure HX-3742" (trade name of a product ex Asahi Chemical Industry Co., Ltd.) and "Novacure HX-3721" (trade name of a product ex Asahi Chemical Industry Co., Ltd.), and a urea adduct type such as "Fujicure FXE-1000" (trade name of a product ex Fuji KaseiK.K.) and "Fujicure FXR-1030" (trade name of a product ex Fuji Kasei K.K.). However, they are not critical.

The borate ester compound usable as an essential additive in the epoxy resin composition of the present invention functions to improve the shelf stability of such epoxy composition. The function is considered to have such mechanism that the compound is allowed to react with the surface of the particles of the latent curing accelerator to modify the same for encapsulation. Typical examples of the borate ester compound include trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradencyl) (1,4,7-trioxaundecyl)borane, tribenzyl borate, triphenyl borate, tri-o-tolyl borate, tri-m-tolyl borate, and triethanolamine borate. These are not critical. Of these, triethyl borate is preferable.

The borate ester compound can be incorporated into the epoxy resin composition of the present invention simultaneously with the other ingredients, i.e., the epoxy resin, the thiol compound and the solid dispersion-type latent curing accelerator or by being mixed in advance with the solid dispersion-type latent curing accelerator. At this case, the mixing can be conducted by contacting both the ingredients in a solvent such as methyl ethyl ketone or toluene, in a liquid epoxy resin or in the absence of a solvent.

It is not particularly difficult to produce the epoxy resin composition of the present invention using the four ingredients, i.e., the epoxy resin, the thiol compound, the solid dispersion-type latent curing accelerator and the borate ester compound. The production can be conducted in a usual manner, for example, by mixing the same with a mixer such as a Henschel mixer. The preferable ratios of the four ingredients are as has been described above.

Further, it is not particularly difficult either to cure the same. It can be conducted in a usual manner, for example, by heating.

The epoxy resin composition of the present invention can contain, as required or desired, various additives which are ordinarily used in this field, such as a filler, a diluent, a solvent, a pigment, a flexibilizer, a coupling agent, an antioxidant, a thixotropic agent and a dispersant.

EXAMPLES

The present invention will be illustrated more specifically by referring to the following Examples.

In the following Examples, the storage stability (shelf stability) was evaluated by measuring a period of time or days that lapsed until a fluidity disappeared at a constant-temperature bath having a predetermined temperature (25° C. and 40° C.).

The curability was evaluated by measuring a gel time at 80° C. on a hot plate as a standard of a low-temperature quick curability. In this connection, gel time is measured as follows. A test composition is put onto a hot plate being maintained at a certain temperature (here, 80° C.) and spread like a thin film thereon. It is observed how the viscosity increases, while touching the thin-spread composition with a spatula. The composition increases in viscosity and gradually gets sticky. Then, it further increases in viscosity and finally ceases to be sticky (i.e., get solidified). The time taken until the last-mentioned state is mamed "gel time".

Further, parts in Examples are parts by weight.

Examples 1 to 7

To 100 parts of a bisphenol A-type epoxy resin "Epikote (EP) –828" (trade name of a product ex Yuka Shell Epoxy K.K.) were added 70 parts of a polythiol compound "TMTP (trimethylolpropane tris(β-thiopropionate))" (trade name of a product ex Yodo Kagaku K.K.). To this were added an amount of "Amicure PN-H" (trade name of a product ex Ajinomoto Co., Inc.) or "Novacure HX-3721" (trade name of a product ex Asahi Chemical Industry Co., Ltd.) as a solid dispersion-type latent curing accelerator, and $B(OBu)_3$ (tributyl borate) or $B(OEt)_3$ (triethyl borate) as a borate ester compound to prepare an epoxy resin composition. Each epoxy resin composition prepared thus was evaluated. The composition and the properties in each Example are shown in Table 1 below.

TABLE 1

| Ingredients | | Example 1 | Example 2 | Example 3 | Example 4 | Example 5 | Example 6 | Example 7 |
|---|---|---|---|---|---|---|---|---|
| Epoxy resin (parts) | EP828 | 100 | 100 | 100 | 100 | 100 | 100 | 100 |
| Polythiol (parts) | TMTP | 70 | 70 | 70 | 70 | 70 | 70 | 70 |
| Latent curing | PN-H | 5 | 5 | 20 | 5 | 20 | | |
| accelerator (parts) | HX-3721 | | | | | | 5 | 20 |
| Borate ester (parts) | $B(OBt)_3$ | | | | 2 | 2 | | |
| | $B(OEt)_3$ | 2 | 5 | 2 | | | 2 | 2 |
| 80° C. gel time | | 1440 secs | 2140 secs | 80 secs | 1018 secs | 380 secs | 3060 secs | 911 secs |
| Storage stability (40° C.) | | 1 month | 1 month | 3 weeks | 1 month | 3 weeks | 1 month | 3 weeks |
| Storage stability (25° C.) | | 2 months | 3 months | 1 month | 3 months | 1 month | 3 moths | 2 monts |

Comparative Examples 1 to 4

Epoxy resin compositions free from the borate ester compound as a fourth ingredient of the epoxy resin composition of the present invention were prepared, and the evaluation was conducted as in Examples 1 to 7. The composition and the properties in each Comparative Example are shown in Table 2.

TABLE 2

| Ingredients | | Compar-ative Example 1 | Compar-ative Example 2 | Compar-ative Example 3 | Compar-ative Example 4 |
|---|---|---|---|---|---|
| Epoxy resin (parts) | EP828 | 100 | 100 | 100 | 100 |
| Polythiol (parts) | TMTP | 70 | 70 | 70 | 70 |
| Latent curing accelerator (parts) | PN-H | 5 | 20 | | |
| | HX-3721 | | | 5 | 20 |
| 80° C. gel time | | 190 secs | 60 secs | 590 secs | 234 secs |
| Storage stability (40° C.) | | 2 hrs | 2 hrs | 8 hrs | 5 hrs |
| Storage stability (25° C.) | | 2 weeks | 7 days | 2 days | 2 days |

Effects of the Invention

The polythiol-type epoxy resin composition of the present invention has such a good stability of 2 or more weeks even at 40° C., and is an excellent, long-pot-life one-part polythiol-type epoxy resin composition, which can be practically applied and replace the conventional one-part polythiol-type epoxy resin compositions which have been problematic in their pot life after mixing the ingredients. Further, it exhibits a good low-temperature quick curability which could not be provided with a conventional one-part resin composition, and especially a composition which can be cured at from 80 to 90° C. for several tens of seconds to several minutes can be produced in accordance with the present invention.

Accordingly, in comparison with a conventional two-part polythiol-type epoxy resin composition, the polythiol-type epoxy resin composition of the present invention is quite advantageous in view of the improvement of the workability and the energy saving, and is suited for an adhesive, a sealer or a coating agent in all fields requiring a low-temperature quick curability, including electronics.

What is claimed is:

1. An epoxy resin composition comprising, as essential ingredients, (1) an epoxy resin having two or more epoxy groups in one molecule, (2) a thiol compound having two or more thiol groups in one molecule, (3) a solid dispersion-type latent curing accelerator and (4) a borate ester compound, in effective amounts.

2. The epoxy resin composition as set forth in claim 1, which comprises said epoxy resin and said thiol compound in a ratio of between 0.5 and 1.2 in terms of the ratio of the SH gram equivalent number of the thiol compound to the epoxy gram equivalent number of the epoxy resin, and said solid dispersion-type latent curing accelerator in an amount of between 1 to 60 parts by weight and borate ester compound in an amount of between 0.1 and 30 parts by weight, respectively, per 100 parts by weight of the epoxy resin.

3. An epoxy resin composition-cured product obtained by curing the epoxy resin composition of claim 1 or 2.

4. The epoxy resin composition as set forth in claim 1, wherein said epoxy resin is a polyglycidyl ether obtained by reacting a polyhydric phenol with epichlorohydrin.

5. The epoxy resin composition as set forth in claim 4, wherein said polyhydric phenol is selected from the group consisting of bisphenol A, bisphenol F, bisphenol AD, catechol, and resorcinol.

6. The epoxy resin composition as set forth in claim 1, wherein said epoxy resin is a polyglycidyl ether obtained by reacting a polyhydric alcohol with epichlorohydrin.

7. The epoxy resin composition as set forth in claim 6, wherein said polyhydric alcohol is selected from the group consisting of glycerol and polyethylene glycol.

8. The epoxy resin composition as set forth in claim 1, wherein said epoxy resin is a glycidyl ether ester obtained by reacting a hydroxycarboxylic acid with epichlorohydrin.

9. The epoxy resin composition as set forth in claim 8, wherein said hydroxycarboxylic acid is selected from the group consisting of p-hydroxybenzoic acid and β-hydroxynaphthoic acid.

10. The epoxy resin composition as set forth in claim 1, wherein said epoxy resin is a polyglycidyl ester obtained by reacting a polycarboxylic acid with epichlorohydrin.

11. The epoxy resin composition as set forth in claim 10, wherein said polycarboxylic acid is selected from the group consisting of phthalic acid and terephthalic acid.

12. The epoxy resin composition as set forth in claim 1, wherein said epoxy resin is selected from the group consisting of epoxydized phenolic novolak resins, epoxydized cresol novolak resins, epoxydized polyolefins, acrylic epoxy resins, and urethane-modified epoxy resins.

13. The epoxy resin composition as set forth in claim 1, wherein said thiol compound is selected from the group consisting of trimethylolpropane tris(thioglycolate), pentaerythritol tetrakis(thioglycolate), ethylene glycol dithioglycolate, trimethylolpropoane tris(β-thiopropionate), pentaerythritol tetrakis(P-thiopropionate), and dipentaerythritol poly(β-thiopropionate).

14. The epoxy resin composition as set forth in claim 1, wherein said thiol compound is selected from the group consisting of 1,4-butanedithiol, 1,6-hexanedithiol, and 1,10-decanedithiol.

15. The epoxy resin composition as set forth in claim 1, wherein said thiol compound is selected from the group consisting of terminal thiol group-containing polyethers, terminal thiol group-containing polythiol ethers, thiol compounds obtained by the reaction of an epoxy compound with hydrogen sulfide, and terminal thiol group-containing thiol compounds obtained by the reaction of a polythiol compound with an epoxy compound.

16. The epoxy resin composition as set forth in claim 1, wherein said solid dispersion-type latent curing accelerator is an imidazole compound which is soluble at room temperature.

17. The epoxy resin composition as set forth in claim 1, wherein said imidazole compounds which is soluble at room temperature is selected from the group consisting of 2-heptadecylimidazole, 2-phenyl-4,5-dihydroxymethylimidazole, 2-undecylimidazole, 2-phenyl-4-methyl-5-hydroxymethylimidazole, 2-phenyl-4-benzyl-5-hydroxymethylimidazole, 2,4-diamino-6-(2-methylimidazolyl-(1))-ethyl-S-triazine, 2,4-diamino-6-(2'-methylimidazolyl-(1)'-ethyl-S-triazine isocyanuric acid adduct, 2-methylimidazole, 2-phenylimidazole, 2-phenyl-4-methylimidazole, 1-cyanoethyl-2-phenylimidazole, 1-cyanoethyl-2-methylimidazole-trimellitate, 1-cyanoethyl-2-phenylimidazole-trimellitate, N-(2-methylimidazolyl-1-ethyl)-urea, and N,N'-(2-methylimidazolyl-(1)-ethyl)-azipolydiamine.

18. The epoxy resin composition as set forth in claim 1, wherein said solid dispersion-type latent curing accelerator is selected from the group consisting of: (a) reaction products of an amine compound with an epoxy compound and (b) reaction products of an amine compound with an isocyanate compound or a urea compound.

19. The epoxy resin composition as set forth in claim 1, wherein said borate ester compound is selected from the group consisting of trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-triundecyl)borane, tribenzyl borate, triphenyl borate, tri-o-tolyl borate, tri-m-tolyl borate, and triethanolamine borate.

20. The epoxy resin composition as set forth in claim 1, wherein said borate ester compound is triethyl borate.

* * * * *